United States Patent
Bickham et al.

(10) Patent No.: US 7,526,169 B2
(45) Date of Patent: Apr. 28, 2009

(54) LOW BEND LOSS QUASI-SINGLE-MODE OPTICAL FIBER AND OPTICAL FIBER LINE

(75) Inventors: Scott Robertson Bickham, Corning, NY (US); Dana Craig Bookbinder, Corning, NY (US); Jeffrey J Englebert, Painted Post, NY (US); Ming-Jun Li, Horseheads, NY (US); Mark Alan McDermott, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 36 days.

(21) Appl. No.: 11/985,665

(22) Filed: Nov. 16, 2007

(65) Prior Publication Data

US 2008/0124028 A1    May 29, 2008

Related U.S. Application Data

(60) Provisional application No. 60/879,702, filed on Jan. 10, 2007, provisional application No. 60/861,776, filed on Nov. 29, 2006.

(51) Int. Cl.
  *G02B 6/032* (2006.01)
  *G02B 6/036* (2006.01)
(52) U.S. Cl. .................... 385/127; 385/125
(58) Field of Classification Search .......... 385/127
  See application file for complete search history.

(56) References Cited

U.S. PATENT DOCUMENTS

| | | | |
|---|---|---|---|
| 5,191,206 A | 3/1993 | Boiarski et al. | 250/227.14 |
| 5,802,236 A | 9/1998 | DiGiovanni et al. | 385/127 |
| 6,535,678 B1 | 3/2003 | Yamauchi et al. | 385/123 |
| 6,614,974 B2 | 9/2003 | Elrefaie et al. | 385/125 |
| 6,621,972 B2 | 9/2003 | Kimerling et al. | 385/132 |
| 6,671,442 B2 | 12/2003 | Wang et al. | 385/125 |
| 6,687,445 B2 | 2/2004 | Carter et al. | 385/127 |
| 6,766,088 B2 | 7/2004 | Hasegawa et al. | 385/123 |
| 6,768,851 B2 | 7/2004 | Chiang et al. | 385/124 |

(Continued)

FOREIGN PATENT DOCUMENTS

EP    1617243 A1    3/2004

(Continued)

OTHER PUBLICATIONS

Kato, Takatoshi et al, "Low Nonlinearity Dispersion-Shifted Fibers Employing Dual-Shaped Core Profile with Depressed Cladding", OFC, Optical Fiber Communication Conference Technical Digest Series, Washington, DC, US, 1997, p. 66.

(Continued)

*Primary Examiner*—Jerry T Rahll
(74) *Attorney, Agent, or Firm*—Joseph M. Homa; Robert L. Carlson; Matthew J. Mason

(57) ABSTRACT

Quasi-single mode optical waveguide fibers are disclosed that are bend resistant and capable of providing single mode transmission, for example at wavelengths greater than 1260 nm when the fundamental mode of optical energy is launched into the core of the fiber. Optical fiber line incorporating quasi-single mode optical waveguide fiber is also disclosed. Jumpers, or patchcords, utilizing quasi-single mode optical waveguide fiber are also disclosed herein.

29 Claims, 3 Drawing Sheets

U.S. PATENT DOCUMENTS

| | | | |
|---|---|---|---|
| 6,773,825 B2 | 8/2004 | Pickrell et al. | 428/566 |
| 6,795,635 B1 | 9/2004 | Fajardo et al. | 385/140 |
| 6,839,484 B2 | 1/2005 | White | 385/29 |
| 6,888,991 B2 | 5/2005 | White | 385/123 |
| 6,904,215 B2 | 6/2005 | Christoff et al. | 385/124 |
| 6,990,277 B2 | 1/2006 | White | 385/39 |
| 7,039,284 B2 | 5/2006 | Nakahara | 385/125 |
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 2004/0069019 A1 | 4/2004 | Carter et al. | 65/414 |
| 2005/0094954 A1 | 5/2005 | Pickrell et al. | 385/123 |
| 2006/0034574 A1 | 2/2006 | Guan et al. | 385/125 |
| 2007/0104437 A1 | 5/2007 | Bookbinder et al. | 385/125 |
| 2008/0013905 A1 | 1/2008 | Bookbinder et al. | 385/124 |

FOREIGN PATENT DOCUMENTS

| | | |
|---|---|---|
| EP | 1657575 A1 | 4/2004 |
| EP | 1564569 A1 | 9/2004 |
| WO | WO02/075393 | 9/2002 |
| WO | WO02/102730 | 12/2002 |
| WO | WO2008/005233 | 1/2008 |

OTHER PUBLICATIONS

Kato, Takatoshi et al, "Dispersion Shifted Fiber For WDM Transmission", Denshi Joho Tsushin Gakkai Gijutsu Kunkyu Hokoku—IEICE Technical Report, Denshi Joho Tsushin Gakkai, Tokyo, JP, Nov. 1996, pp. 43-48.

Sharma, Enakshi K. et al, "Calculation of Cutoff Frequencies in Optical Fibers for Arbitrary Profiles Using the Matrix Method", IEEE Journal of Quantum Electronics, vol. QE-17, No. 12, Dec. 1981, pp. 2317-2321.

Matsui, Takashi, et al. "Coating damage suppression in hole-assisted fiber for high optical power wiring", Optical Fiber Communication Conference, 2006 and the 2006 National Fiber Optic Engineers Conference, Mar. 5-10, 2006, p. 3.

Nakajima, K., "Cutoff Wavelength Measurement in a Fiber With Improved Bending Loss", IEEE Photonics Technology Letters, vol. 16, No. 8, Aug. 2004, pp. 1918-1920.

Kamikawa, Neil, et al., "A Quasi-single Mode Optical Fiber for Long-Haul Transmission in Seer Bending Environments", IEEE Photonics Technology Letters, vol. 6, No. 3, Mar. 1994, pp. 428-430.

Jeunhomme, "Single Mode Fiber Optics", Marcel Dekker, New York, 1990, p. 39-44.

A. Sharma and A.K. Ghatak, "A Simple Numerical Method for the Cutoff Frequency of Single Mode Fibers with Arbitrary Index Profiles," IEEE Trans. Microwave Theory Tech. vol. MTT-29, Jun. 1981 pp. 607-610.

Kato, Takatoshi et al, "Low Nonlinearity Dispersion-Shifted Fibers Employing Dual-Shaped Core Profile with Depressed Cladding", OFC, Optical Fiber Communication Conference Technical Digest Series, Washington, DC, US, 1997, p. 66 (Feb. 1997).

Kato, Takatoshi et al, "Dispersion Shifted Fiber For WDM Transmission", Denshi Joho Tsushin Gakkai Gijutsu Kunkyu Hokoku—IEICE Technical Report, Denshi Joho Tsushin Gakkai, Tokyo, JP, Nov. 1996, pp. 43-48.

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

Bing, Y, et al, "Low-loss Holey Fiber", Hitachi Cable Review No. 24, Aug. 2005, pp. 1-5.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 23, No. 16, pp. 1409-1411.

Matsuo, S. et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

U.S. Appl. No. 12/004,174, filed Dec. 20, 2007, titled "Bend Resistant Multimode Optical Fiber".

LOW BEND LOSS QUASI-SINGLE-MODE OPTICAL FIBER AND OPTICAL FIBER LINE

CROSS-REFERENCE TO RELATED APPLICATIONS

This application claims the benefit of and priority to U.S. Patent Application No. 60/861,776 filed on Nov. 29, 2006, and U.S. Patent Application No. 60/879,702 filed on Jan. 10, 2007, the contents of which are relied upon and incorporated herein by reference in their entirety.

BACKGROUND OF THE INVENTION

1. Field of the Invention

The present invention relates generally to optical fiber, and particularly to bend resistant optical fiber and optical fiber lines providing single mode transmission.

2. Technical Background

Optical fibers utilized in so-called "access" and fiber to the premises (FTTx) optical networks can be subjected to a variety of bending environments. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

SUMMARY OF THE INVENTION

Quasi-single mode optical waveguide fiber is disclosed herein that is bend resistant and is capable of providing single mode transmission at any deployment length, for example at wavelengths greater than 1260 nm, provided that only the fundamental mode of optical energy is launched into the core of the fiber. Optical fiber line comprised of first and second optical fibers, the second fiber being a quasi-single mode optical waveguide fiber. Jumpers, or patchcords, utilizing quasi-single mode optical waveguide fiber are also disclosed herein.

One aspect of the present invention relates to an optical fiber comprising a first region comprising a maximum delta 1, $\Delta 1_{MAX}$, and a second region surrounding the first region having a delta 2, such as a maximum delta 2, $\Delta 2_{MAX}$, and a third region surrounding the second region comprising a minimum delta 3, $\Delta 3_{MIN}$, wherein $\Delta 1_{MAX} > \Delta 2_{MAX} > \Delta 3_{MIN}$, MFD>9.0 µm at 1550 nm, wherein the second region is at least 1 micron wide, and the optical fiber has a length, $L_2$ and a measured fiber cutoff wavelength, $\lambda_{C2-L2}$ corresponding to the length $L_2$, greater than 1500 nm and the optical fiber has a core cutoff wavelength, $\lambda_{C2-TH}$, less than 1300 nm. The fiber preferably exhibits a measured fiber cutoff wavelength, $\lambda_{C2-L2}$ greater than 1700 nm. Preferably, the third region (or region 3) comprises a plurality of randomly distributed voids, which together preferably result in the fiber exhibiting a cross-sectional total fiber void area percent greater than 0.1 percent. However, the fiber is not limited to using randomly distributed voids within region 3 and other methods of adjusting the refractive index can be employed, for example by employing fluorine in region 3. The fiber preferably exhibits a 1×10 mm macrobend loss at 1550 nm of less than 0.10 dB/turn, more preferably less than 0.050 dB/turn.

Another aspect of the present invention relates to an optical fiber comprising a first region comprising maximum delta 1, $\Delta 1_{MAX}$, and a second region surrounding the first region comprising $\Delta 2_{MAX}$, and a third region surrounding the second region comprising minimum delta 3, $\Delta 3_{MIN}$, wherein $\Delta 1_{MAX} > \Delta 2_{MAX} > \Delta 3_{MIN}$, wherein the second region is at least 1 micron wide, and the fiber has a length $L_2$ and exhibits a measured fiber cutoff wavelength corresponding to the length $L_2$, $\lambda_{C2-L2}$, greater than 1300 nm and the optical fiber has a core cutoff wavelength, $\lambda_{C2-TH}$, less than 1300 nm. The third region of the fiber preferably comprises a plurality of randomly distributed voids. The fiber preferably exhibits a measured fiber cutoff wavelength, $\lambda_{C2-L2}$ greater than 1550 nm, more preferably greater than 1700 nm. In some preferred embodiments, the second region is at least 2 microns wide. In some preferred embodiments, the third region comprises a plurality of randomly distributed voids, which preferably result in the fiber exhibiting a cross-sectional total fiber void area percent greater than 0.1 percent. In some embodiments, preferably the optical fiber exhibits a 1×10 mm macrobend loss at 1550 nm of less than 0.10 dB/turn, more preferably less than 0.050 dB/turn.

Another aspect of the present invention relates to an optical fiber comprising a first region comprising $\Delta 1_{MAX}$, a second region surrounding the first region and comprising $\Delta 2_{MAX}$ and a width $W_2$, and a third region surrounding the second region and comprising $\Delta 3_{MIN}$, wherein $\Delta 1_{MAX} > \Delta 2_{MAX} > \Delta 3_{MIN}$, wherein said fiber exhibits a 22 meter cut-off wavelength which is less than 1300, more preferably less than 1260 nm, and the 2 meter cut-off wavelength is more than 100 nm greater than the 22 meter cut-off wavelength.

Another aspect of the present invention relates to an optical transmission line comprised of a first optical fiber having a length $L_1$ and a measured cutoff wavelength, $\lambda_{C1-L1}$, corresponding to the length $L_1$, wherein $\lambda_{C1-L1}$ is measured with respect to a multimode reference under FOTP-80, and wherein $\lambda_{C1-L1}$ is less than 1260 nm; and a second fiber having a length $L_2$ comprising a first region having maximum delta 1, $\Delta 1_{MAX}$, and a second region surrounding the first region having a maximum delta 2, $\Delta 2_{MAX}$, and a third region surrounding the second region comprising minimum delta 3, $\Delta 3_{MIN}$, wherein $\Delta 1_{MAX} > \Delta 2_{MAX} > \Delta 3_{MIN}$, wherein the second fiber exhibits a measured fiber cutoff wavelength corresponding to length $L_2$, $\lambda_{C2-L2}$, greater than 1300 nm. Preferably, the second fiber exhibits a measured fiber cutoff wavelength, $\lambda_{C2-L2}$ greater than 1500 nm, more preferably greater than 1700 nm. The third region of the second fiber preferably comprises a profile volume with an absolute magnitude greater than 60%-µm². Also preferably, the second fiber comprises a plurality of voids contained in the third region, which preferably result in the fiber exhibiting a cross-sectional total fiber void area percent greater than 0.1 percent. The second fiber in the optical transmission line preferably comprises a core cutoff wavelength, $\lambda_{C2-TH}$, less than 1600 nm, more preferably less than 1300 nm. Such transmission lines can be employed, for example, to make jumper cables, e.g., wherein at least part of the first optical fiber is disposed within an optical fiber connector. In such jumper cable embodiments, $L_1$ is preferably less than 10 cm, and $L_2$ is preferably less than 0.5 meter. Such transmission lines may additionally comprise a third optical fiber having a length $L_3$ and a measured cutoff wavelength, $\lambda_{C3-L3}$, corresponding to the length $L_3$, wherein $\lambda_{C3-L3}$ is measured with respect to a multimode reference under FOTP-80, and wherein $\lambda_{C3-L3}$ is less than 1260 nm, wherein a second end of the second optical fiber is optically coupled to the third optical fiber.

Reference will now be made in detail to the present preferred embodiments of the invention, examples of which are illustrated in the accompanying drawings.

DETAILED DESCRIPTION OF THE PREFERRED EMBODIMENT

Figure 1:
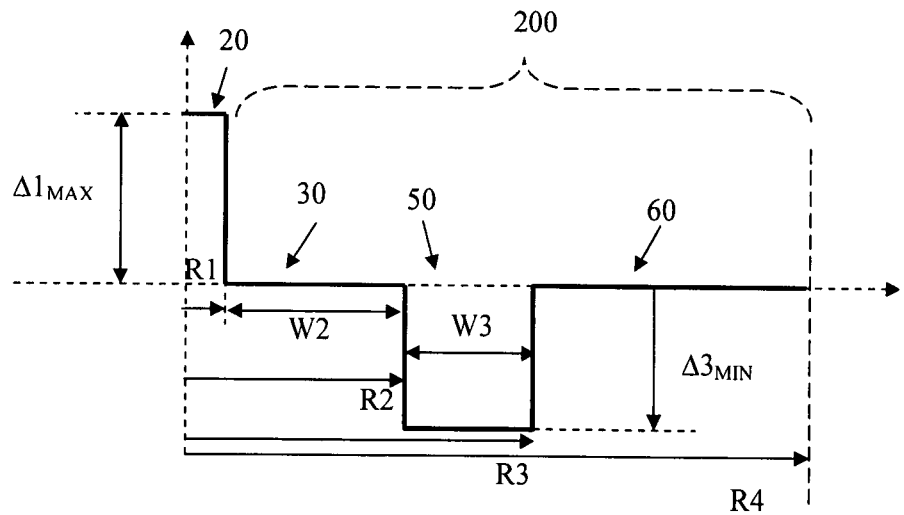
FIG. 1 shows a relative refractive index profile of an embodiment of a quasi-single mode optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the refractive index in region i, unless otherwise specified, and $n_c$ is the average refractive index of the annular inner region of the cladding. The relative refractive index percent is referenced to 1550 nm unless otherwise specified. The average refractive index of the annular inner region of the cladding can be calculated, for example, by taking "N" index measurements ($n_{C1}, n_{C2}, \ldots n_{CN}$) in the annular inner region of the cladding, and computing the average refractive index by:

$$n_c = (1/N) \sum_{i=1}^{i=N} n_{ci}.$$

As used herein, the relative refractive index is represented by $\Delta$ and its values are given in units of "%", unless otherwise specified. In cases where the refractive index of a region is less than the average refractive index of the annular inner region, the relative index percent is negative and is referred to as having a depressed region or depressed index, and the minimum relative refractive index is calculated at the point at which the relative index is most negative unless otherwise specified. In cases where the refractive index of a region is greater than the average refractive index of the inner cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi (\int f^2 r\, dr)^2 / (\int f^4 r dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, $2w = MFD$, and $w^2 = (2\int f^2 r\, dr/\int [df/dr]^2 r\, dr)$, the integral limits being 0 to $\infty$.

The bend resistance of a waveguide fiber can be gauged by induced attenuation under prescribed test conditions, for example by wrapping one or more turns around a cylindrical mandrel having a constant diameter.

Unless otherwise noted herein, optical properties (such as dispersion, dispersion slope, etc.) are reported for the LP01 mode. Unless otherwise noted herein, the reference wavelength is 1550 nm.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the higher order mode propagation constant becomes equal to the plane wave propagation constant in the cladding. The higher order and plane wave mode propagation constants are calculated for an arbitrary index profile by numerically solving the scalar wave equation. See, for example, A. Sharma and A. K. Ghatak, "A simple numerical method for the cutoff frequency of single mode fibers with arbitrary index profiles," IEEE Trans. Microwave Theory Tech. vol. MTT-29, pp. 607-610, June 1981.

The fiber cutoff is measured by the method prescribed by FOTP-80 (EIA-TIA-455-80). The FOTP-80 test is performed to either strip out the higher order modes using a controlled amount of bending, or to normalize the spectral response of the fiber to that of a multimode fiber. The FOTP-80 test prescribes using a 2 m length of the fiber under test but that method may also be applied to other fiber lengths. Each higher order mode has a cutoff wavelength, but the term "cutoff wavelength" refers to the lowest frequency (longest wavelength) higher order mode unless otherwise specified. A spectral bench such as the 2500 Optical Fiber Measurement System manufactured by Photon Kinetics has a limited spectral wavelength range with a predetermined maximum wavelength of 1600 nm or in some cases 1700 nm. Some fibers have cutoff wavelengths that are greater than this maximum wavelength, but it will be readily apparent to one skilled in the art that the actual cutoff wavelength of the fiber under test will be greater than 1260 nm, 1550 nm or even 1700 nm.

An optical transmission line as used herein includes a length of optical fiber, or a plurality of optical fibers fused together serially, extending between optical devices, for example between two fiber optic connectors, or between two optical amplifiers, or between a multiplexing device and an optical amplifier.

Quasi-single mode optical fiber disclosed herein comprises a core and a cladding surrounding and directly adjacent the core. In some embodiments, the core comprises silica doped with germanium, i.e., germania doped silica. Dopants other than germanium, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

Referring to FIG. 1, quasi-single mode optical waveguide fibers are disclosed herein which comprise: a core 20 extending radially outwardly from the centerline to a core outer radius, $R_1$, and having a relative refractive index profile, $\Delta_1(r)$ in %, with a maximum relative refractive index percent, $\Delta_{1MAX}$; and, a cladding 200 surrounding and directly adjacent, i.e. in direct contact with, the core 20.

The core has a profile volume, $V_1$, defined herein as:

$$2\int_0^{R_1} \Delta_1(r) r\, dr.$$

The core cutoff wavelength is defined as the theoretical cutoff wavelength calculated for the portion of the refractive index profile comprised of the core and the annular inner cladding portion.

The annular ring region has a profile volume, $V_3$, defined herein as:

$$2\int_{R_2}^{R_3} \Delta_3(r) r\, dr$$

where $R_2$ is the annular inner portion outer radius and $R_3$ is the depressed index annular portion as defined below.

Width $W_2$ is greater than 1 µm, and preferably $W_2 > 2$ µm, and in some embodiments $W_2$ is between 2 and 6 µm.

Width $W_3$ is greater than 1 µm, and preferably $W_3 > 3$ µm.

Preferably, $R_4 > 40$ µm. In some embodiments, $R_4 > 50$ µm. In other embodiments, $R_4 > 60$ µm. In some embodiments, 60 µm $< R_4 < 70$ µm.

In some embodiments, the central segment of the core of the second fiber or the first or third fibers may comprise a relative refractive index profile having a so-called centerline dip which may occur as a result of one or more optical fiber manufacturing techniques. For example, the central segment may have a local minimum in the refractive index profile at radii less than 1 µm, wherein higher values for the relative refractive index (including the maximum relative refractive index for the core segment) occur at radii greater than r=0 µm.

FIG. 1 shows a schematic representation of a cross-section of the glass portion of an embodiment of a quasi-single mode optical fiber comprising a cladding 200, the cladding comprising an annular inner portion 30, a depressed index annular portion 50, and an annular outer portion 60. The depressed index annular portion 50 is shown spaced away from the core 20 by the annular inner portion 30. The annular portion 50 surrounds and contacts the inner portion 30. The annular outer portion 60 surrounds and contacts the annular portion 50. With respect to the refractive index of the annular inner portion 30, where here $\Delta 2(r)=0\%$, the minimum relative refractive index of the annular portion 50, $\Delta 3_{MIN}$, is lower than the maximum relative refractive index of the core, $\Delta 1_{MAX}$, and lower than the maximum relative refractive index of the annular inner portion 30, $\Delta 2_{MAX}$, and lower than the minimum relative refractive index of the annular inner portion 30, $\Delta 2_{MIN}$, and lower than $\Delta 4(r)$. That is, $\Delta 1_{MAX} > \Delta 2_{MAX} > \Delta 3_{MIN}$, and $\Delta 1_{MAX} > \Delta 2_{MIN} > \Delta 3_{MIN}$. In some embodiments, the core 20 has an entirely non-negative refractive index profile, where $\Delta 1(r) > 0\%$, and in other embodiments, the core 20 has an entirely positive refractive index profile, where $\Delta 1(r) > 0\%$. In some embodiments, the annular inner portion 30 has a relative refractive index profile $\Delta 2(r)$ having a maximum absolute magnitude less than 0.05%, i.e. $\Delta 2_{MAX} < 0.05\%$ and $\Delta 2_{MIN} > -335$ 0.05%. In some embodiments, the annular inner portion 30 comprises pure silica. In some embodiments, the annular outer portion 60 comprises pure silica. In some embodiments, the depressed index annular portion 50 comprises pure silica provided with a plurality of holes. Preferably, the minimum relative refractive index, or average effective relative refractive index, such as taking into account the presence of any holes, of the depressed index annular portion 50 is preferably less than −0.1%. The holes can contain one or more gases, such as argon, nitrogen, carbon dioxide, or oxygen, or the holes can contain a vacuum with substantially no gas; regardless of the presence or absence of any gas, the refractive index in the annular portion 50 is lowered due to the presence of the holes. The holes can be randomly or non-periodically disposed in the annular portion 50 of the cladding 200, and in other embodiments, the holes are disposed periodically in the annular portion 50. Alternatively, or in addition, the depressed index in annular portion 50 can also be provided by a higher core delta, $\Delta 1_{MAX}$, and updoping the annular outer portion 60, wherein the depressed index annular portion 50 is, for example, pure silica or silica which is not doped as heavily as the annular outer portion 60. The depressed index annular portion 50 has a minimum refractive index which is lower than the maximum refractive index of the core 20. By "non-periodically disposed" or "non-periodic distribution", we mean that when one takes a cross section (such as a cross section perpendicular to the longitudinal axis) of the optical fiber, the nonperiodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. parallel to the longitudinal axis) of the optical fiber, but do not extend the entire length of the entire fiber for typical lengths of transmission fiber. While not wishing to be bound by theory, it is believed that the holes extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose endpoints are disposed on the silica internal surface defining the hole when the optical fiber is viewed in perpendicular cross-section transverse to the longitudinal axis of the fiber. Methods of making such optical fibers with holes are described in U.S. Publication No. US 2007/0104437, which is incorporated herein by reference in their entirety.

Cladding 200 comprises: an annular inner portion 30 surrounding the core 20 and directly adjacent thereto, extending radially outwardly to an annular inner portion outer radius, $R_2$, having a width $W_2$ disposed at a midpoint $R_{2MID}$, the portion 30 having a relative refractive index profile, $\Delta_2(r)$ in %, with a maximum relative refractive index percent, $\Delta_{2MAX}$, in %, a minimum relative refractive index percent, $\Delta_{2MIN}$, in %, and a maximum absolute magnitude relative refractive index percent, $|\Delta_2(r)|_{MAX}$; a depressed index annular portion (or "ring") 50 surrounding portion 30 and directly adjacent thereto, and extending radially outwardly from $R_2$ to an depressed index annular portion radius, $R_3$, the portion 50 having a width $W_3$ disposed at a midpoint $R_{3MID}$, and having a relative refractive index profile, $\Delta_3(r)$ in %, with a minimum relative refractive index percent, $\Delta 3_{MIN}$, in %, wherein $\Delta_{1MAX}>0>\Delta_{3MIN}$; and an annular outer portion 60 surrounding the portion 50 and directly adjacent thereto and having a relative refractive index percent, $\Delta_{CLAD}(r)$ in %. $R_1$ is defined to occur at the radius where $\Delta_1(r)$ first reaches +0.05%. That is, core 20 ends and the annular inner portion 30 starts where the relative refractive index first reaches +0.05% (going outward radially) at a radius R1, and portion 30 is defined to end at a radius R2 where the relative refractive index $\Delta_2(r)$ first reaches −0.05% (going outward radially), or where the radially innermost holes begin. The depressed index annular portion 50 begins at $R_2$ and ends at $R_3$ for this group of embodiments. $R_3$ is defined to occur where the relative refractive index $\Delta_3(r)$ first reaches −0.05% (going outward radially) after $\Delta_3(r)$ has dipped to at least −0.1%, or where the radially outermost holes end. The width $W_3$ of the annular portion 50 is $R_3-R_2$ and its midpoint $R_{3MID}$ is $(R_2+R_3)/2$. In some embodiments, more than 90% of the radial width of the central segment has a positive relative refractive index, and in some embodiments $\Delta_1(r)$ is positive for all radii from 0 to $R_1$. In some embodiments, $|\Delta_2(r)|<0.025\%$ for more than 50% of the radial width of the annular inner portion 30, and in other embodiments $|\Delta_2(r)|<0.01\%$ for more than 50% of the radial width of the annular inner portion 30. $\Delta_3(r)$ is negative for all radii from $R_2$ to $R_3$. Preferably, $\Delta(r)=0\%$ for all radii greater than 40 μm. The core ends and the cladding begins at a radius $R_{CORE}$. Cladding 200 extends to a radius, $R_4$, which is also the outermost periphery of the glass part of the optical fiber. Also, $\Delta_{1MAX}>\Delta_{2MAX}>\Delta_{3MIN}$, and $\Delta_{MAX}>\Delta_{2MIN}>\Delta_{3MIN}$. In some embodiments, the cladding comprises an annular inner portion surrounding and in contact with the core, a depressed index annular portion surrounding and in contact with the annular inner portion, wherein the depressed index annular portion extends to the outermost periphery of the cladding, i.e. the outermost periphery of the glass portion of the optical fiber; in these embodiments, the cladding does not have the outer annular portion 60, and the relative refractive index profile of the fiber would be taken with respect to pure silica.

In some embodiments, the core 20 has an entirely non-negative refractive index profile, where $\Delta_1(r)\geqq 0\%$, and in other embodiments, the core 20 has an entirely positive refractive index profile, where $\Delta_1(r)>0\%$. In some embodiments, the annular inner portion 30 has a relative refractive index profile $\Delta_2(r)$ having a maximum absolute magnitude less than 0.05%, i.e. $\Delta_{2MAX}<0.05\%$ and $\Delta_{2MIN}>-0.05\%$. In some embodiments, the annular inner portion 30 comprises pure silica. In some embodiments, the annular outer portion 60 comprises pure silica. In some embodiments, the depressed index annular portion 50 comprises pure silica provided with a plurality of holes. Preferably, the minimum relative refractive index, or average effective relative refractive index, such as taking into account the presence of any holes, of the depressed index annular portion 50 is preferably less than −0.1%.

In one set of embodiments, the second optical fiber comprises a core 20 surrounded and contacted by a cladding 200, the cladding comprising an annular inner portion 30, a depressed index annular portion 50, and an outer clad portion 60. The depressed index annular portion 50 is spaced away from the core 20 by the annular inner portion 30. The annular portion 50 surrounds and contacts the inner portion 30. The outer clad portion 60 surrounds and contacts the annular portion 50. In some embodiments, the outer clad portion 60 has a substantially constant refractive index profile, and in some of these embodiments comprises pure silica, and in some of those embodiments, the outer clad portion 60 consists of pure silica. The core 20 has an entirely positive refractive index profile, where $\Delta_1(r)>0\%$, relative to the inner clad portion 60. The annular inner portion 30 has a relative refractive index profile $\Delta_2(r)$ having a maximum absolute magnitude less than 0.05%, i.e. $\Delta_{2MAX}<0.05\%$ and $\Delta_{2MIN}>-0.05\%$, and in some embodiments comprises pure silica. The depressed index annular portion 50 has an entirely negative refractive index profile, where $\Delta_3(r)<0\%$, and $\Delta_{3MIN}<-0.1\%$, relative to the inner clad portion 30.

In another set of embodiments, the second optical fiber comprises a core 20 surrounded and contacted by a cladding 200, the cladding comprising an annular inner portion 30, a depressed index annular portion 50, and an outer clad portion 60. The depressed index annular portion 50 is spaced away from the core 20 by the annular inner portion 30. The annular portion 50 surrounds and contacts the inner portion 30. The outer clad portion 60 surrounds and contacts the annular portion 50. The outer clad portion 60 has a substantially constant refractive index profile, and in some of these embodiments comprises pure silica, and in some of those embodiments, the outer clad portion 60 consists of pure silica. In some embodiments, the core 20 has an entirely positive refractive index profile, where $\Delta_1(r)>0\%$, relative to the inner clad portion 30. The annular inner portion 30 has a relative refractive index profile $\Delta_2(r)$ having a maximum absolute magnitude less than 0.05%, i.e. $\Delta_{2MAX}<0.05\%$ and $\Delta_{2MIN}>-$ 0.05%, and in some embodiments comprises pure silica. The depressed index annular portion 50 comprises a plurality of holes, which in some embodiments are disposed non-periodically throughout the annular portion 50. In some of these embodiments, the annular portion 50 comprises pure silica. The annular inner portion 30 and the outer clad portion 60 are both hole-free.

The core 20 of the quasi-single mode optical fiber supports only single-moded transmission of optical signals directed into the core, i.e. core 20 can support only a single mode, the fundamental mode, i.e. the LP01 mode. The cladding 200, and in particular the annular inner portion 30 and the depressed index annular portion 50 have the capacity to support more than a single mode (LP01, LP11, etc.), but as disclosed herein, only the LP01 mode is directed into the core 20, and delivery of optical energy into the cladding is minimized or preferably avoided. That is, (a) delivery of optical energy in the LP01 mode into the cladding 200, and/or (b) leakage of optical energy in the LP01 mode from the core 20 of the quasi-single mode optical fiber into the cladding 200, is/are minimized or preferably avoided. Generally, delivery of optical energy into the cladding 200 should be minimized or preferably avoided. Preferably, both (a) and (b) are minimized, more preferably both are avoided. The refractive index profile of the core 20 helps to minimize, or preferably avoids, (b) leakage of LP01 mode optical energy from the core 20 into the cladding 200. Appropriate optical signal spot size and proper alignment of the entering light with the quasi-single mode optical fiber (e.g. the alignment of a first optical fiber and the quasi-single mode optical fiber, or their cores, or the alignment of an optical source such as a VCSEL and the quasi-single mode optical fiber) help with (a). For example, for a first optical fiber joined to a second optical fiber which is a quasi-single mode optical fiber, either by connectorization or by splicing, if the respective cores are undesirably laterally offset, an undesirable amount of optical energy in the LP01 mode could enter the cladding 30 of the quasi-single mode optical fiber.

In one aspect, (a) and (c) are provided by a first optical fiber coupled upstream of a second optical fiber (i.e. signals pass through the first optical fiber before passing through the second optical fiber).

Figure 2:
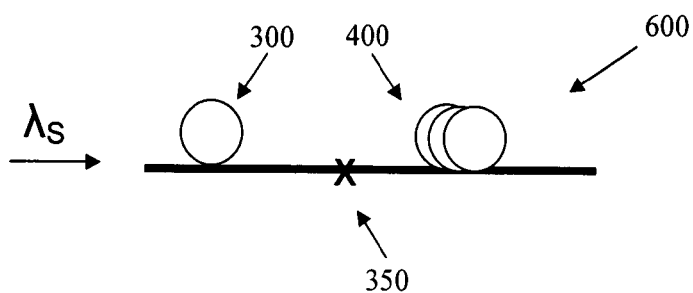
FIG. 2 schematically illustrates an optical transmission line disclosed herein comprised of two optical fibers for transporting optical signals at an operating wavelength $\lambda_S$.

FIG. 2 schematically illustrates an optical transmission line 600 disclosed herein for transporting optical signals at an operating wavelength $\lambda_S$. The optical transmission line comprises: a first optical fiber 300 and a second optical fiber 400, wherein the first optical fiber 300 is optically coupled to one end of the second optical fiber 400 at a joint 350, wherein the second optical fiber 400 is a quasi-single mode optical fiber.

In this aspect, an optical fiber line 600 is disclosed herein for handling light signals at a first operating wavelength with a plurality of light modes, including LP01 and LP11 light modes, the optical fiber line 600 comprising: a first optical fiber 300 of length $L_1$ and capable of stripping the LP11 light mode at wavelengths below the first operating wavelength from the light passing through the first optical fiber, and a second optical fiber 400 of length $L_2$ and not capable of stripping the LP11 light mode from the light passing through at least a portion of the second optical fiber 400 at wavelengths below the first operating wavelength, wherein the second optical fiber 400 is optically coupled to the first optical fiber portion, wherein the second optical fiber comprises a central core and a cladding surrounding and in contact with the central core, wherein the central core is capable of supporting transmission of only the LP01 mode of the light passing through the second optical fiber at wavelengths above the first operating wavelength. Preferably, the first optical fiber 300 has a first LP01 mode field diameter, MFD1, and the second optical fiber 400 has a second LP01 mode field diameter, MFD2, and 0.8<MFD1/MFD2<1.2.

Figure 3:
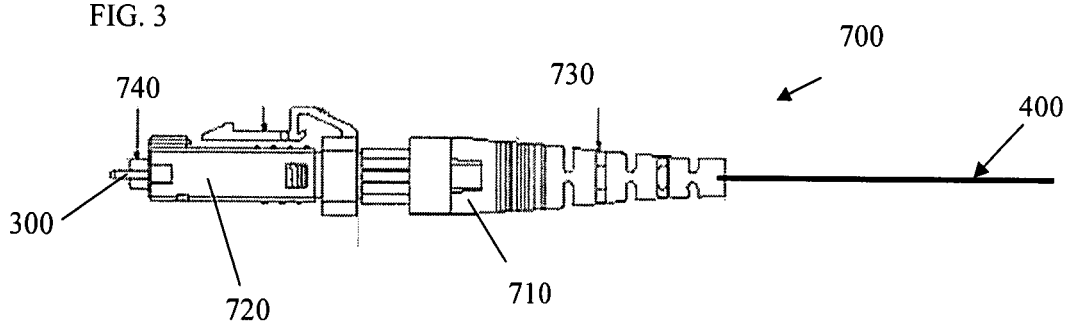
FIG. 3 schematically illustrates one end of an exemplary jumper, or patchcord, as disclosed herein, comprising a quasi-single mode optical waveguide fiber.

FIG. 3 schematically illustrates one end of an exemplary jumper, or patchcord, 700 as disclosed herein, comprising an optical fiber connector 710 comprised of a housing 720 and a boot, or sheath, 730 wherein the first optical fiber 300 is at least partially disposed within the housing 720, and wherein a first end of the first optical fiber 300 is preferably supported by a ferrule 740. The second end of the first optical fiber is, in some embodiments, disposed within the optical fiber connector 710, such as within the housing 720 or within the boot 730, and a first end of the second optical fiber 400 is joined to the second end of the first optical fiber, wherein at least part of the second optical fiber projects out of the boot 730. In other embodiments, the second end of the first optical fiber jumper projects out of the boot 730, and the connection 350 between the first and second optical fibers is disposed outside of the optical connector. Preferably, the first optical fiber 300 is deployed with as little bend as possible, for example, aided by the rigidity provided by the housing 720 and/or the boot 730.

FOTP-80 fiber and cable cutoff tests provide protocols for establishing cutoff measurements for an optical fiber. Both fiber and cable cutoff measurements in FOTP-80 are based on a so-called overfilled launch, and the cutoff wavelength is defined by comparing the measured output power with either the output power from a multimode reference (i.e. the "multimode reference") or the output power that is measured when the fiber under test is coiled at a bend radius that removes all but the fundamental LP01 mode (i.e. the "bend reference").

The first optical fiber has a length $L_1$ and a measured cutoff wavelength, $\lambda_{C1-L1}$, corresponding to the length $L_1$, wherein $\lambda_{C1-L1}$ is measured with respect to either a multimode reference or a bend reference under FOTP-80, and wherein $\lambda_{C1-L1}$ is less than $\lambda_S$.

The second optical fiber, i.e. the quasi-single mode optical fiber, has a length $L_2$ and a measured cutoff wavelength, $\lambda_{C2-L2}$, corresponding to the length $L_2$, wherein $\lambda_{C2-L2}$ is measured with respect to a multimode reference under FOTP-80, wherein $\lambda_{C2-L2}$ is greater than $\lambda_S$, and wherein the second optical fiber has a core cutoff wavelength, $\lambda_{C2-TH}$, less than $\lambda_S$.

Generally, the measured cutoff wavelength will decrease with increasing optical fiber length. Even if $L_2$ is long enough to provide single mode transmission by the end of its length, if the signal is transported via multimode transmission in the initial portion of its length, then the first optical fiber is still necessary to help reduce multipath interference (MPI) that would otherwise be induced in the initial portion of the second optical fiber without the presence of the first optical fiber. That is, the presence of the first optical fiber ensures that the signal is transported through the entire length of the optical fiber line in single moded transmission.

The second optical fiber comprises glass extending from a centerline to an outermost glass radial periphery.

In embodiments disclosed herein, the second optical fiber comprises a glass portion, and the glass portion extends from the centerline to $R_2$. The core cutoff wavelength, $\lambda_{C2-TH}$, corresponding to the glass portion extending from the centerline to $R_2$ can be determined. In the embodiments disclosed herein, the actual theoretical cutoff of the second optical fiber would be lower than the core cutoff wavelength due to fluorine or randomly distributed holes (voids) in the depressed index annular portion of the cladding, and therefore if the approximated theoretical cutoff is lower than $\lambda_S$, then the actual theoretical cutoff will also be lower than $\lambda_S$.

Typically, optical signals are generated at one or more wavelengths, wherein each wavelength is made up of a fundamental mode (LP01) and a plurality of higher order modes (LP11, etc.). As disclosed herein, optical signals are introduced into the first optical fiber, and the first optical fiber provides a restricted launch of the optical signals into the second optical fiber. The first optical fiber has a cutoff wavelength less than the signal wavelength and preferably has a relatively small spotsize. For example, in some embodiments, the first optical fiber has a 2 m cutoff wavelength of less than 1300 nm and a mode field diameter (i.e. an LP01 mode field diameter) of less than 10 μm at 1310 nm, and in some of these embodiments, the first optical fiber has a 2 m cutoff wavelength of less than 1260 nm and an LP01 mode field diameter of less than 9.5 μm at 1550 nm; some examples of such first optical fiber include, but are not limited to, Hi980, Hi780, Hi 1060 or SMF-28e® optical fibers, all manufactured and sold by Corning Incorporated. Thus, the first optical fiber delivers optical signals at the operating signal wavelength (and higher) via single mode transmission (i.e. only in the fundamental LP01 mode) and with a relatively small spotsize (or mode field diameter, MFD). The first optical fiber thus effectively acts as a spectral filter, stripping out the LP11 and higher modes. Preferably the spotsizes of the first and second optical fibers are substantially matched and the respective cores of the first and second fibers are aligned with minimal or no measurable offset. The core of the second fiber is single-moded, i.e. supports only the fundamental LP01 mode, even though the second optical fiber as a whole has the capacity to support one or more higher order modes at $\lambda_S$ (such as the LP11 mode) outside the core, i.e. the second optical fiber might otherwise be characterized as a multimode optical fiber. Thus, the second optical fiber may not yield a measurable cutoff wavelength according to the FOTP-80 cutoff determination procedure. In the second optical fiber, the inner annular portion between the core and the depressed index annular portion of the cladding could support one or more modes if optical energy were launched into the inner annular portion because the depressed index annular portion might trap optical energy in the inner annular portion. However, adequate splicing and/or connectorization of the first and second fibers (core alignment with minimal lateral offset, etc.), along with the restricted launch and small spotsize of the optical signals entering the second fiber, help to prevent excitation and/or propagation of higher order modes in the cladding of the second fiber. With the optical energy of the signals being contained substantially within the core of the second fiber, the signals are capable of continuing to be transported through the second fiber via effectively single mode transmission. The coupling between the fundamental mode in the core and the modes in the inner cladding is low enough such that the second fiber behaves like a single mode fiber as deployed in a system, and therefore such fiber can be referred to as quasi-single-mode fiber.

Figure 4:
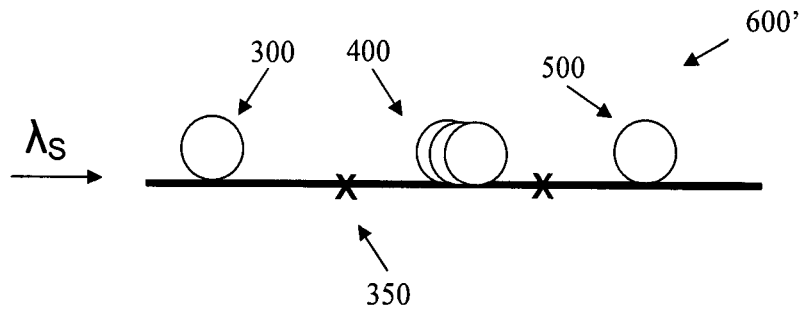
FIG. 4 schematically illustrates an optical transmission line disclosed herein comprised of three optical fibers for transporting optical signals at an operating wavelength $\lambda_S$.

Referring to FIG. 4, the opposite end of the second fiber 400 is preferably optically connected to another single moded optical fiber 500. In some embodiments, this opposite end is an output end. Such third optical fiber 500 has a length $L_3$ and a cutoff wavelength, $\lambda_{C3-L3}$, corresponding to the length $L_3$, wherein $\lambda_{C3-L3}$ is measured with respect to either the multi-mode reference or the bend reference under FOTP-80, and wherein $\lambda_{C3-L3}$ is less than $\lambda_S$. Such third optical fiber 500 can help to prevent signal reflections from traveling in the optical transmission line in a direction opposite to the direction of signal propagation.

In some embodiments, the first and third optical fibers are substantially similar, for example $L_1$ is substantially equal to $L_3$, and $\lambda_{C1-L1}$ is substantially equal to $\lambda_{C3-L3}$, and the first and third optical fibers have substantially similar refractive index profiles. Such embodiments promote ease of use and/or installation because the optical transmission line can be bi-directional and/or reversible, i.e. optical signals can be launched into the first optical fiber or into the third optical fiber without regard to orientation of the line. Such optical fiber line can be regarded as being symmetric.

Joining of the first and second, and/or the second and third, optical fibers can be accomplished by splicing, such as fusion splicing, or via optical fiber connectors.

EXAMPLE 1

125 grams of $SiO_2$ (0.40 g/cc density) soot were flame deposited onto a 1 meter long ×10 mm diameter step index (0.36 percent delta, 0.33 core/clad diameter ratio) $GeO_2$—$SiO_2$ core-$SiO_2$ clad cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent argon sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a argon-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 4750 grams of additional $SiO_2$ (0.39 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica argon-seeded ring (i.e., silica with holes containing argon), and void-free overclad blank. The blank was placed for 24 hours in an argon purged holding oven set at 1000° C. to outgas the helium from the blank. The optical fiber preform was drawn to 125 micron diameter fiber at 18 meters/second in a furnace having an 8" long hot zone set at 2000° C. Optical properties for this fiber showed a 2 meter fiber cutoff of 1475 nm and a multimode attenuation of 2.6 and 1.6 dB/km at 1310 and 1550 nm, respectively. A two meter piece of SMF28e® single mode fiber was spliced to this fiber in order to launch the fundamental mode of this Example 1 fiber, it showed mode field diameter at 1550 nm of 10.05 microns; macrobend performance is shown in Table 2. SEM analysis of the end face of the fiber showed an approximately 4.5 micron radius $GeO_2$—$SiO_2$ center core region surrounded by an approximately 13 micron outer radius void-free near clad region surrounded by an approximately 16 micron outer radius void containing cladding region which is surrounded by a void-free pure silica outer cladding having an outer diameter of 125 microns (all radial dimensions measured from the center of the optical fiber). The void containing ring region comprised 7.4 percent regional area percent holes (100 percent Ar by volume) in that area with an average diameter of 0.35 microns and the smallest diameter holes at 0.03 microns and a maximum diameter of 0.72 microns, resulting in about 200 total number of holes in the fiber cross-section. The total fiber void area percent (area of the holes divided by total area of the optical fiber cross-section×100) was about 0.21 percent.

EXAMPLE 2

590 grams of $SiO_2$ (0.35 g/cc density) soot were flame deposited onto a 1 meter long×10 mm diameter step index (0.36 percent delta, 0.33 core/clad diameter ratio) $GeO_2$—$SiO_2$ core-$SiO_2$ clad cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving 200 mm/min (corresponding to approximately a 100° C./min temperature increase for the outside of the soot preform during the downdrive process) through a hot zone set at 1490° C. in a 100 percent argon sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a argon-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 3790 grams of additional $SiO_2$ (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica argon-seeded ring (i.e., silica with holes containing argon), and void-free overclad blank. The blank was placed for 24 hours in an argon purged holding oven set at 1000° C. to outgas the helium from the blank. The optical fiber preform was drawn to 125 micron diameter fiber at 18 meters/second in a furnace having an 8" long hot zone set at 2000° C. Optical properties for this fiber showed a 2 meter fiber cutoff of >1700 nm and a multimode attenuation of 1.7 and 1.1 dB/km at 1310 and 1550 nm, respectively. A two meter piece of SMF28e® single mode fiber was spliced to this fiber in order to launch the fundamental mode of this Example 2 fiber, it showed mode field diameter at 1550 nm of 9.79 microns; macrobend performance is shown in Table 2. SEM analysis of the end face of the fiber showed an approximately 4.5 micron radius $GeO_2$—$SiO_2$ center core region surrounded by an approximately 12 micron outer radius void-free near clad region surrounded by an approximately 17 micron outer radius void containing cladding region which is surrounded by a void-free pure silica outer cladding having an outer diameter of 125 microns (all radial dimensions measured from the center of the optical fiber). The void containing ring region comprised 8.4 percent regional area percent holes (100 percent Ar by volume) in that area with an average diameter of 0.33 microns and the smallest diameter holes at 0.03 microns and a maximum diameter of 0.8 microns, resulting in about 300 total number of holes in the fiber cross-section. The total fiber void area percent (area of the holes divided by total area of the optical fiber cross-section×100) was about 0.28 percent.

EXAMPLE 3

616 grams of $SiO_2$ (0.41 g/cc density) soot were flame deposited onto a 1 meter long×10 mm diameter step index (0.35 percent delta, 0.33 core/clad diameter ratio) $GeO_2$—$SiO_2$ core-$SiO_2$ clad cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent nitrogen sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a nitrogen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 4540 grams of additional $SiO_2$ (0.37 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica nitrogen-seeded ring (i.e., silica with holes containing nitrogen), and void-free overclad blank. The blank was placed for 24 hours in an argon purged holding oven set at 1000° C. to outgas the helium from the blank. The optical fiber preform was drawn to 125 micron diameter fiber at 18 meters/second in a furnace having an 8" long hot zone set at 2000° C. Optical properties for this fiber showed a 2 meter fiber cutoff of 1504 nm and a attenuation of 1.0 and 0.205 dB/km at 1310 and 1550 nm, respectively. When spliced to a 2 meter piece of SMF28e® single mode fiber in order to launch the fundamental mode of this Example 3 fiber, it showed mode field diameter at 1550 nm of 9.7 microns; macrobend performance is shown in Table 2. SEM analysis of the end face of the fiber showed an approximately 4.2 micron radius $GeO_2$—$SiO_2$ center core region surrounded by an approximately 11 micron outer radius void-free near clad region surrounded by an approximately 15 micron outer radius void containing cladding region which is surrounded by a void-free pure silica outer cladding having an outer diameter of 125 microns (all radial dimensions measured from the center of the optical fiber). The void containing ring region comprised 6.7 percent regional area percent holes (100 percent $N_2$ by volume) in that area with an average diameter of 0.28 microns and the smallest diameter holes at 0.03 microns and a maximum diameter of 0.65 microns, resulting in about 280 total number of holes in the fiber cross-section. The total fiber void area percent (area of the holes divided by total area of the optical fiber cross-section×100) was about 0.19 percent.

EXAMPLE 4

230 grams of $SiO_2$ (0.38 g/cc density) soot were flame deposited onto a 1 meter long×10 mm diameter step index (0.33 percent delta, 0.33 core/clad diameter ratio) $GeO_2$—$SiO_2$ core-$SiO_2$ clad cane, thereby resulting in a preform comprising a consolidated core region which was surrounded by a consolidated silica cladding region which in turn was surrounded by a soot silica region. The soot cladding of this assembly was then doped with fluorine and sintered into a blank as follows. The assembly was first dried for 2 hours in an atmosphere consisting of helium and 3 percent chlorine at 1000° C., then doped and sintered to clear glass by down driving at 14 mm/min (corresponding to approximately a 7° C./min heat up rate) through a hot zone set at 1490° C. in a 2.5 SLPM $SiF_4$ and 10 SLPM He sintering atmosphere. The blank was then placed for 24 hours in an argon purged holding oven set at 1000° C. This preform was then placed back in a lathe where 4630 grams of additional $SiO_2$ (0.49 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, fluorine, and void-free overclad blank. The blank was placed for 24 hours in an argon purged holding oven set at 1000° C. to outgas the helium from the blank. The optical fiber preform was drawn to 125 micron diameter fiber at 18 meters/second in a furnace having an 8" long hot zone set at 2000° C. Optical properties for this fiber showed a 2 meter fiber cutoff of 1391 nm and an attenuation of 0.73 and 0.197 dB/km at 1310 and 1550 nm, respectively. A two meter piece of SMF28e® single mode fiber was spliced to this fiber in order to launch the fundamental mode of this Example 4 fiber, it showed mode field diameter at 1550 nm of 9.62 microns; macrobend performance is shown in Table 4. RNF (refractive near field) analysis of the end face of the fiber showed an approximately 4.6 micron radius $GeO_2$—$SiO_2$ center core region surrounded by an approximately 8.2 micron outer radius void-free near clad region surrounded by an approximately 15.8 micron outer radius fluorine containing cladding region which is surrounded by a void-free pure silica outer cladding having an outer diameter of 125 microns (all radial dimensions measured from the center of the optical fiber).

EXAMPLE 5

141 grams of $SiO_2$ (0.39 g/cc density) soot were flame deposited onto a 1 meter long×10 mm diameter step index (0.33 percent delta, 0.33 core/clad diameter ratio) $GeO_2$—$SiO_2$ core-$SiO_2$ clad cane, thereby resulting in a preform comprising a consolidated core region which was surrounded by a consolidated silica cladding region which in turn was surrounded by a soot silica region. The soot cladding of this assembly was then doped with fluorine and sintered into a blank as follows. The assembly was first dried for 2 hours in an atmosphere consisting of helium and 3 percent chlorine at 1000° C., then doped and sintered to clear glass by down driving at 14 mm/min (corresponding to approximately a 7° C./min heat up rate) through a hot zone set at 1490° C. in a 2.5 SLPM $SiF_4$ and 10 SLPM He sintering atmosphere. The blank was then placed for 24 hours in an argon purged holding oven set at 1000° C. This preform was then placed back in a lathe where 4250 grams of additional $SiO_2$ (0.43 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, fluorine, and void-free overclad blank. The blank was placed for 24 hours in an argon purged holding oven set at 1000° C. to outgas the helium from the blank. The optical fiber preform was drawn to 125 micron diameter fiber at 18 meters/second in a furnace having an 8" long hot zone set at 2000° C. Optical properties for this fiber showed a 2 meter fiber cutoff of 1479 nm and an attenuation of 1.2 and 0.190 dB/km at 1310 and 1550 nm, respectively. A two meter piece of SMF28e®V single mode fiber was spliced to this fiber in order to launch the fundamental mode of this Example 5 fiber, it showed mode field diameter at 1550 nm of 9.23 microns; macrobend performance is shown in Table 4. RNF analysis of the end face of the fiber showed an approximately 5.4 micron radius $GeO_2$—$SiO_2$ center core region surrounded by an approximately 12.7 micron outer radius void-free near clad region surrounded by an approximately 18.6 micron outer radius fluorine containing cladding region which is surrounded by a void-free pure silica outer cladding having an outer diameter.

EXAMPLE 6

1000 grams of $SiO_2$ (0.4 g/cc density) soot were deposited via OVD onto a fully consolidated 1 meter long×10.3 mm diameter step index (0.35 percent delta, 0.33 core/clad diameter ratio) $GeO_2$—$SiO_2$ core-$SiO_2$ clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 32 mm/min (corresponding to approximately a 16° C./min temperature increase for the outside of the soot preform during the downdrive process) through a hot zone set at 1490° C. in a 100 percent oxygen sintering atmosphere. The preform assembly was then re-down driven (i.e., a second time) through the hot zone at 25 mm/min (corresponding to approximately a 12.5° C./min temperature increase for the outside of the soot preform during the downdrive process). The preform assembly was then re-down driven (i.e., a third time) and final sintered through the hot zone at 6 mm/min (corresponding to approximately a 3° C./min temperature increase for the outside of the soot preform during the downdrive process) in order to sinter the soot into a oxygen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 2000 grams of additional $SiO_2$ (0.37 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica oxygen-seeded ring (i.e., silica with holes containing oxygen), and void-free overclad blank. The blank was placed for 24 hours in an argon purged holding oven set at 1000° C. to outgas the helium from the blank. The resultant optical fiber preform was drawn into a 125 micron diameter optical fiber at 1 m/s using a draw furnace having a hot zone of about 2.54 cm length and set at 2100° C. SEM analysis of the end face of a fiber showed an approximately 4 micron radius $GeO_2$—$SiO_2$ core surrounded by a 12 micron outer radius void-free near clad region surrounded by 37 micron outer radius void containing cladding region (radial ring thickness of approximately 25 microns) which is surrounded by a void-free pure silica outer cladding having an outer diameter of about 125 microns (all radial dimensions measured from the center of the optical fiber). The void containing ring region comprised 8.3 percent regional area percent holes (100 percent $O_2$ by volume) in that area with an average diameter of 0.45 microns and the smallest diameter holes at 0.03 microns and a maximum diameter of 1.0 microns, resulting in about 1000 total number of holes in the fiber cross-section. The total fiber void area percent (area of the holes divided by total area of the optical fiber cross-section×100) was about 2.9 percent. Optical properties for this fiber showed a 2 meter fiber cutoff of >1700 nm and a multimode attenuation of 0.94 and 0.66 dB/km at 1310 and 1550 nm, respectively. When spliced to a 2 meter piece of SMF28e® single mode fiber in order to launch the fundamental mode of this Example 6 fiber, it showed mode field diameter at 1550 nm of 10.7 microns an attenuation of 0.33 and 0.19 dB/km at 1310 and 1550 nm, respectively, and, thereby making the fiber single moded at wavelengths above 1250 nm. A portion of this Example 6 fiber was measured for bend performance around a 10 mm diameter mandrel, and the fiber exhibited an increase in attenuation at 1550 nm of about 0.001 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.002 dB/turn, thus demonstrating that attenuation increases of less than 1 dB/turn, and more preferably less than 0.1 dB/turn, and still more preferably less than 0.05 dB/turn, around a 20 mm diameter mandrel are achievable.

EXAMPLE 7

250 grams of $SiO_2$ (0.4 g/cc density) soot were deposited via OVD onto a fully consolidated 1 meter long×10.5 mm diameter step index (0.35 percent delta, 0.33 core/clad diameter ratio) $GeO_2$—$SiO_2$ core-$SiO_2$ clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent nitrogen sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a fourth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a nitrogen-seeded overclad blank. The first series of higher downfeed rate were employed to glaze the outside of the optical fiber preform, which facilitates trapping of the gases in the preform. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 3550 grams of additional $SiO_2$ (0.44 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to a germania containing void-free core, silica void-free inner cladding, silica nitrogen-seeded ring (i.e., silica with holes containing nitrogen), and void-free overclad blank. The blank was placed for 24 hours in an argon purged holding oven set at 1000° C. to outgas the helium from the blank. The optical fiber preform was drawn to 125 micron diameter fiber at 10 meters/second in a furnace having an 8" long hot zone set at 2000° C. SEM analysis of the end face of a fiber showed an approximately 4 micron radius $GeO_2$—$SiO_2$ core surrounded by a 12 micron outer radius void-free near clad region surrounded by 19 micron outer radius void containing cladding region (radial ring thickness of approximately 7 microns) which is surrounded by a void-free pure silica outer cladding having an outer diameter of about 125 microns (all radial dimensions measured from the center of the optical fiber). The void containing ring region comprised 2.5 percent regional area percent holes (100 percent $N_2$ by volume) in that area with an average diameter of 0.19 microns and the smallest diameter holes at 0.05 microns and a maximum diameter of 0.47 microns, resulting in about 630 total number of holes in the fiber cross-section. The total fiber void area percent (area of the holes divided by total area of the optical fiber cross-section×100) was about 0.47 percent. Optical properties for this fiber showed a 2 meter fiber cutoff of >1700 nm and a multimode attenuation of 1.9 and 1.2 dB/km at 1310 and 1550 nm, respectively. When spliced to a 2 meter piece of SMF28e® single mode fiber in order to launch the fundamental mode of this Example 7 fiber, it showed mode field diameter at 1550 nm of 10.3 microns an attenuation of 0.32 and 0.205 dB/km at 1310 and 1550 nm, respectively, and, thereby making the fiber single moded at wavelengths above 1250 nm. A portion of this Example 7 fiber was measured for bend performance around a 10 mm diameter mandrel, and the fiber exhibited an increase in attenuation at 1550 nm of about 0.001 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.001 dB/turn, thus demonstrating that attenuation increases of less than 1 dB/turn, and more preferably less than 0.1 dB/turn, and still more preferably less than 0.05 dB/turn, around a 20 mm diameter mandrel are achievable.

Optical properties for Examples 1-5 were measured. A portion of each fiber was measured for bend performance according to FOTP-62 (IEC-60793-1-47) by wrapping 1 turn around a either a 10 mm or 20 mm diameter mandrel (the 1×10 mm diameter macrobend loss or the 1×20 mm diameter macrobend loss) and measuring the increase in attenuation at 1550 nm due to the bending.

Tables 1-2 list characteristics of illustrative examples, Examples 1-3, of first set of embodiments for a second optical fiber as disclosed herein. The refractive index profiles of Examples 1-3 are similar to FIG. 1, wherein the depressed annular region 35 comprises a plurality of holes, as discussed above, with the following respective values.

TABLE 1

| | | Example | | |
|---|---|---|---|---|
| | | 1 | 2 | 3 |
| $\Delta_{1MAX}$ | % | 0.36 | 0.36 | 0.35 |
| $R_1$ | μm | 4.5 | 4.5 | 4.2 |
| $\alpha_1$ | | 10 | 10 | 10 |
| $V_1$ | %-μm² | 5.50 | 5.90 | 4.86 |
| $R_2$ | μm | 12.8 | 12.3 | 11.2 |
| $R_1/R_2$ | | 0.36 | 0.37 | 0.38 |
| $W_2$ | μm | 8.2 | 7.7 | 7 |
| $R_{2MID}$ | μm | 8.7 | 8.45 | 7.7 |
| $R_3$ | μm | 15.9 | 17 | 15.3 |
| $W_3$ | μm | 3.1 | 4.7 | 4.1 |
| $R_{3MID}$ | μm | 14.4 | 14.7 | 13.3 |
| $R_4$ | μm | 62.5 | 62.5 | 62.5 |

TABLE 2

| | | Example | | |
|---|---|---|---|---|
| | | 1 | 2 | 3 |
| MFD @ 1310 nm | μm | 8.77 | 8.62 | 8.49 |
| Aeff @ 1310 nm | μm² | 60.4 | 58.4 | 56.6 |
| MFD @ 1550 nm | μm | 10.05 | 9.79 | 9.74 |
| Aeff @ 1550 nm | μm² | 79.3 | 75.3 | 74.5 |
| 1 m Cutoff | nm | 1541 | 1648 | 1626 |
| 2 m Cutoff | nm | 1475 | 1656 | 1504 |
| 10 m Cutoff | nm | 1349 | 1660 | 1329 |
| 20 m Cutoff | nm | 1335 | 1567 | 1317 |
| 22 m Cutoff | nm | 1330 | 1560 | 1300 |
| 50 m Cutoff | nm | 1296 | 1465 | 1176 |
| 100 m Cutoff | nm | 1238 | 1376 | 1168 |
| 200 m Cutoff | nm | 1223 | 1333 | 1154 |
| 500 m Cutoff | nm | 1214 | 1295 | 1128 |
| 1000 m Cutoff | nm | 1206 | 1277 | 1100 |
| Core LP11 Cutoff | nm | 1273 | 1288 | 1202 |
| Theoretical Cutoff | nm | <1273 | <1288 | <1202 |
| Spectral Attenuation | dB/km | — | — | 0.205 |
| 1 × 10 mm Dia. Macrobend Loss | dB/turn | 0.010 | 0.007 | 0.020 |
| 1 × 20 mm Dia. Macrobend Loss | dB/turn | 0.001 | 0.005 | 0.005 |

Tables 3-4 list characteristics of illustrative examples, Examples 4-5, of a second set of embodiments for a second optical fiber as disclosed herein. The refractive index profiles of Examples 4-5 are similar to FIG. 1, wherein the depressed annular region 35 comprises fluorine doped silica, as discussed above, with the following respective values.

TABLE 3

| | | Example | |
|---|---|---|---|
| | | 4 | 5 |
| $\Delta_{1MAX}$ | % | 0.35 | 0.36 |
| $R_1$ | μm | 4.6 | 5.4 |
| $\alpha_1$ | | 10 | 10 |
| $V_1$ | %-μm² | 5.1 | 8.2 |
| $R_2$ | μm | 8.2 | 12.7 |
| $R_1/R_2$ | | 0.56 | 0.43 |
| $W_2$ | μm | 3.6 | 7.3 |
| $R_{2MID}$ | μm | 6.4 | 9.05 |
| $\Delta_{3MIN}$ | % | −0.45 | −0.41 |
| $R_3$ | μm | 15.8 | 18.6 |
| $W_3$ | μm | 7.6 | 5.9 |
| $R_{3MID}$ | μm | 12.0 | 15.7 |
| $|V_3|$ | %-μm² | 65.3 | 72.0 |
| $R_4$ | μm | 62.5 | 62.5 |

TABLE 4

| | | Example | |
|---|---|---|---|
| | | 4 | 5 |
| MFD @ 1310 nm | μm | 7.55 | 7.10 |
| Aeff @ 1310 nm | μm² | 44.8 | 39.6 |
| MFD @ 1550 nm | μm | 9.62 | 9.23 |
| Aeff @ 1550 nm | μm² | 72.7 | 66.9 |
| 1 m Cutoff | nm | 1478 | 1596 |
| 2 m Cutoff | nm | 1391 | 1479 |
| 10 m Cutoff | nm | 1317 | 1429 |
| 20 m Cutoff | nm | 1257 | 1424 |
| 22 m Cutoff | nm | 1255 | 1420 |
| 50 m Cutoff | nm | 1240 | 1399 |
| 100 m Cutoff | nm | 1234 | 1359 |
| 200 m Cutoff | nm | 1220 | 1358 |
| 500 m Cutoff | nm | 1189 | 1350 |
| 1000 m Cutoff | nm | 1186 | 1349 |

TABLE 4-continued

| | | Example | |
|---|---|---|---|
| | | 4 | 5 |
| Core LP11 cutoff | nm | 1272 | 1572 |
| Theoretical Cutoff | nm | 1176 | 1491 |
| 1 × 10 mm Dia. Macrobend Loss | dB/turn | 0.035 | 0.041 |
| 1 × 20 mm Dia. Macrobend Loss | dB/turn | 0.009 | 0.005 |

Example 4 in Table 4 comprises a first region comprising $\Delta 1_{MAX}$, a second region surrounding the first region and comprising $\Delta 2_{MAX}$ and a width $W_2$, and a third region surrounding the second region and comprising $\Delta 3_{MIN}$, wherein $\Delta 1_{MAX} > \Delta 2_{MAX} > \Delta 3_{MIN}$, wherein said fiber exhibits a 22 meter cut-off wavelength which is less than 1300, more preferably less than 1260 nm, and the 2 meter cut-off wavelength is more than 100 nm greater than the 22 meter cut-off wavelength. As seen from Tables 2 and 4, attenuation increases of less than 0.10 dB/turn, and more preferably less than 0.05 dB/turn, around a 10 mm diameter mandrel are achievable, and attenuation increases of less than 0.010 dB/turn, and more preferably less than 0.005 dB/turn around a 20 mm diameter mandrel are achievable using the second optical fiber disclosed herein. As seen from Table 4, Example 4 could be utilized as a second optical fiber for an operating or signal wavelength of 1300 nm, because the theoretical cutoff is 1176 nm, i.e. less than 1300 nm. Conversely, Example 5 would not be utilized as a second optical fiber for an operating or signal wavelength of 1300 nm because the theoretical cutoff is 1491 nm. However, Example 5 could be utilized as a 1-meter length of second optical fiber for an operating or signal wavelength of 1550 nm, because the theoretical cutoff is less than the operating wavelength, and the measured 1-meter cutoff is 1596 nm, which is greater than the operating wavelength.

Figure 5:
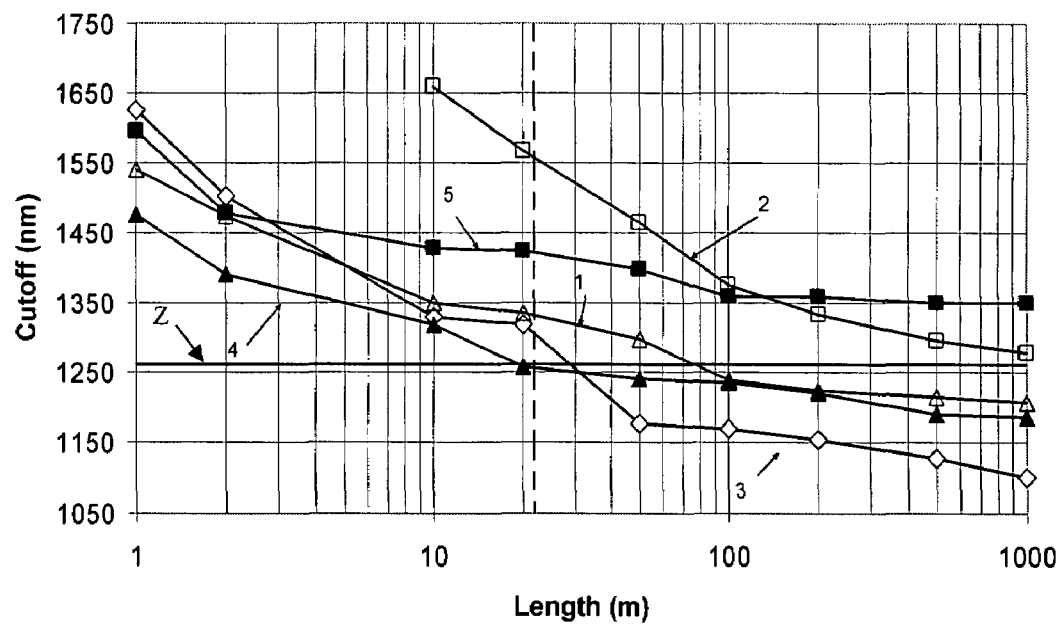
FIG. 5 shows measured cutoff versus optical fiber length for various embodiments of quasi-single mode optical fiber disclosed herein.

FIG. 5 shows the measured cutoff versus optical fiber length for Examples 1-5 by lines 1-5, respectively. A reference line Z is also drawn in FIG. 5 for a constant cutoff value of 1260 nm. FIG. 5 shows that the measured cutoff of each of the fibers results in multimoded transmission at a wavelength of, say, 1300 nm for fiber lengths less than about 20 meters. For some of the illustrated fibers at longer lengths, with an overfilled launch, signal transmission would evolve into single moded transmission at a wavelength of 1300 nm (e.g. Example 1 at lengths of about 75 m and greater). It should be noted that optical signals at 1300 nm which are launched with an overfilled launch into, say, a 100 m length of the optical fiber of Example 1 would be multi-moded until about 75 m; such signal would have been subjected to multi-path interference (MPI) in that initial portion of the fiber, and performance degraded, even if the signal were to emerge at 100 m as single-moded. Conversely, and again referring to FIG. 5, signal transmissions at wavelengths of about 1550 nm and greater would be single-moded for all lengths ≧1 meter for an optical fiber such as Example 1.

Figure 6:
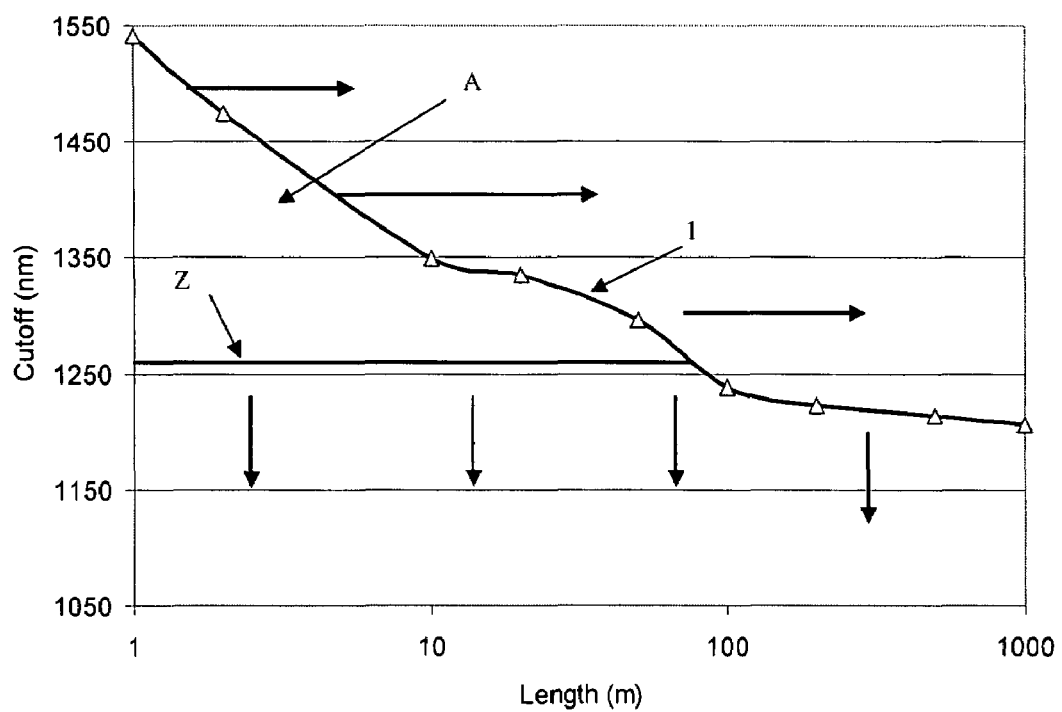
FIG. 6 schematically illustrates the cutoff versus optical fiber length for an optical transmission line disclosed herein comprising first and second optical fibers.

FIG. 6 schematically illustrates the cutoff versus optical fiber length for an optical transmission line disclosed herein comprising first and second optical fibers, the first optical fiber having a length $L_1$ and a measured cutoff wavelength, $\lambda_{C1-L1}$, corresponding to the length $L_1$, equal to 1260 nm, and the second optical fiber corresponding to Example 1. The first and second optical fibers have similar mode field diameters at about 1300 nm, and the two fibers are connected such that splice losses are minimal. The influence of the first optical fiber on cutoff is represented by the region A below line 1 and above the horizontal line Z of 1260 nm extending from a length of 1 m to about 75 m; i.e. optical transmissions above 1260 nm and in that region are single-moded in the second optical fiber from the point of launch and to the end of the second optical fiber, even at lengths greater than 75 m. Conversely, transmissions below 1260 nm will be multimoded for lengths up to 75 m, and if the length of the second optical fiber is greater than 75 m, the transmission will become single-moded at 1260 nm, although those transmissions had been multimoded and will be degraded by MPI. The area above line 1 represents a single mode regime in the "second" optical fiber even when such fiber is used without a first optical fiber.

It should be noted that relatively small lengths of the first optical fiber, such as SMF-28e® optical fiber of Corning Incorporated, can suffice to effectively establish such a cutoff wavelength (e.g. corresponding to line Z in FIG. 6). For example, length $L_1$ can be less than 10 cm, or less than 5.0 cm, or less than 2.0 cm, or even less than 1.0 cm; at the same time, length $L_2$ can be greater than 0.5 meter, greater than 1.0 meter, greater than 2.0 meters, greater than 5.0 meters, greater than 10.0 meters, and greater than 100.0 meters.

As disclosed herein, optical signals launched into the so-called second optical fiber are launched as single-mode light signals, and the core of the second optical fiber is a single-moded core. (An optical fiber comprised of the single-moded core of the second optical fiber, but with a cladding without an offset depressed ring region, would be a single-moded fiber, at the operating wavelength of interest.) The signals are launched into the core of the second optical fiber.

Optical fiber such as Examples 1-5 have very low attenuations induced by macrobending of the fiber or by microbending of the fiber.

In some embodiments, a heterogeneous optical fiber line is disclosed herein comprising a single moded optical fiber optically connected to a first end, for example an input end, of a second optical fiber, wherein the second fiber has a theoretical cutoff wavelength that is less than 1260 nm, a 2 m fiber cutoff wavelength that is greater than 1260 nm, and the second fiber has a depressed index cladding segment, or annular region. The macrobend loss of the second fiber is preferably less than 0.2 dB/turn at 1550 nm when the fiber is bent around a mandrel with a diameter of 10 mm. The depressed index annular region of the cladding can be provided by a plurality of holes or doped silica doped, such as silica doped with fluorine, or holes in silica doped with fluorine.

The holes can advantageously be randomly or nonperiodically disposed in the annular region of the cladding. The depressed index annular region can also be provided by a higher delta core and an updoped outer clad region, wherein the depressed index annular region is pure silica or silica which is not doped as heavily as the outer clad region. The opposite end, for example an output end, of the second fiber is preferably optically connected to another single moded optical fiber; such optically connected first, second, and third optical fibers can form an optical patchcord with extremely low macro- and micro-bend losses.

Figure 7:
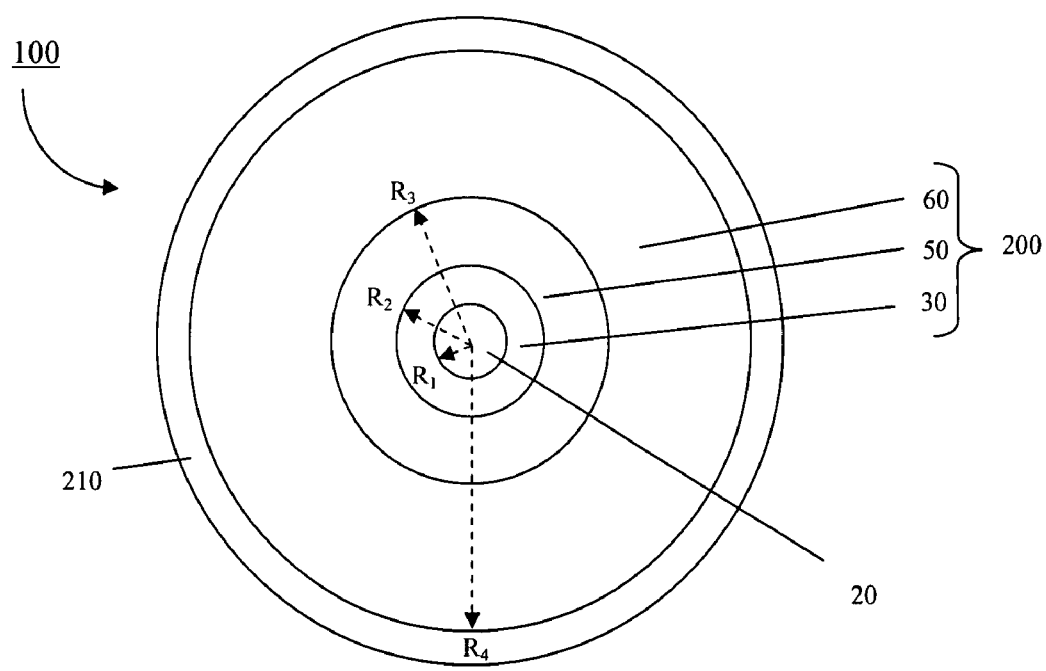
FIG. 7 is a schematic representation of a cross-sectional view of an optical waveguide fiber 100 as disclosed herein.

FIG. 7 is a schematic representation (not to scale) of a cross-sectional view of an optical waveguide fiber 100 as disclosed herein having core 20 and a cladding 200 directly adjacent and surrounding the core 20, the cladding 200 being comprised of an annular inner portion 30, a depressed index annular portion 50, and an annular outer portion 60. The core 20 can have one or a plurality of core segments.

One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In preferred embodiments, the cladding has an outer diameter, 2*Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising a first region comprising $\Delta 1_{MAX}$, a second region surrounding the first region and comprising $\Delta 2_{MAX}$ and a width $W_2$, and a third region surrounding the second region and comprising $\Delta 3_{MIN}$, wherein $\Delta 1_{MAX} > \Delta 2_{MAX} > \Delta 3_{MIN}$, wherein a mode field diameter at 1550 nm is greater than 9.0 μm, wherein $W_2$ is at least 1 micron wide, and wherein the optical fiber comprises a length $L_2$ and a measured fiber cutoff wavelength corresponding to the length $L_2$, $\lambda_{C2-L2}$, greater than 1500 nm, and the optical fiber has a core cutoff wavelength, $\lambda_{C2-TH}$, less than 1300 nm.

2. The optical fiber of claim 1, wherein the measured fiber cutoff wavelength, $\lambda_{C2-L2}$, is greater than 1700 nm.

3. The optical fiber of claim 1, wherein the third region comprises a plurality of randomly distributed voids.

4. The optical fiber of claim 1, wherein the third region comprises a cross-sectional total fiber void area percent greater than 0.1 percent.

5. The optical fiber of claim 1, wherein the third region comprises fluorine.

6. The optical fiber of claim 1, wherein the optical fiber exhibits a 1×10 mm macrobend loss at 1550 nm of less than 0.10 dB/turn.

7. The optical fiber of claim 1, wherein the optical fiber exhibits a 1×10 mm macrobend loss at 1550 nm of less than 0.050 dB/turn.

8. An optical fiber comprising a first region comprising $\Delta 1_{MAX}$ and a second region surrounding the first region and comprising $\Delta 2_{MAX}$, and a third region surrounding the second region and comprising $\Delta 3_{MIN}$, wherein the third region comprises a plurality of randomly distributed voids, and wherein $\Delta 1_{MAX} > \Delta 2_{MAX} > \Delta 3_{MIN}$, wherein the second region is at least 1 micron wide, wherein the optical fiber comprises a length $L_2$ and a measured fiber cutoff wavelength corresponding to the length $L_2$, $\lambda_{C2-L2}$, greater than 1300 nm, and the optical fiber has a core cutoff wavelength, $\lambda_{C2-TH}$, less than 1300 nm.

9. The optical fiber of claim 8, wherein the measured fiber cutoff wavelength, $\lambda_{C2-L2}$, is greater than 1550 nm.

10. The optical fiber of claim 8, wherein the measured fiber cutoff wavelength, $\lambda_{C2-L2}$, is greater than 1700 nm.

11. The optical fiber of claim 8, wherein the second region is at least 2 microns wide.

12. The optical fiber of claim 8, wherein the third region comprises a cross-sectional total fiber void area percent greater than 0.1 percent.

13. The optical fiber of claim 8, wherein the third region comprises fluorine.

14. The optical fiber of claim 8, wherein the optical fiber exhibits a 1×10 mm macrobend loss at 1550 nm of less than 0.10 dB/turn.

15. The optical fiber of claim 8, wherein the optical fiber exhibits a 1×10 mm macrobend loss at 1550 nm of less than 0.050 dB/turn.

16. An optical transmission line comprised of:
a first optical fiber having a length $L_1$ and a measured cutoff wavelength, $\lambda_{C1-L1}$, corresponding to the length $L_1$, wherein $\lambda_{C1-L1}$ is measured with respect to a multimode reference under FOTP-80, and wherein $\lambda_{C1-L1}$ is less than 1260 nm;
a second fiber having a length $L_2$ comprising a first region comprising $\Delta 1_{MAX}$, a second region surrounding the first region and comprising $\Delta 2_{MAX}$, and a third region surrounding the second region and comprising $\Delta 3_{MIN}$, wherein $\Delta 1_{MAX} > \Delta 2_{MAX} > \Delta 3_{MIN}$, and wherein the second fiber exhibits a measured fiber cutoff wavelength corresponding to the length $L_2$, $\lambda_{C2-L2}$, greater than 1300 nm.

17. The optical transmission line of claim 16, wherein $L_2$ is greater than 0.5 meter.

18. The optical transmission line of claim 16, wherein $\lambda_{C2-L2}$ is greater than 1700 nm.

19. The optical transmission line of claim 16, wherein the third region of the second fiber comprises a profile volume with an absolute magnitude greater than 60%-μm².

20. The optical transmission line of claim 16, wherein the second fiber comprises a plurality of voids contained in the third region.

21. The optical transmission line of claim 16, wherein the second region is at least 1 micron wide.

22. The optical transmission line of claim 16, wherein the second fiber comprises a core cutoff wavelength, $\lambda_{C2-TH}$, less than 1600 nm.

23. The optical transmission line of claim 16, wherein the second fiber comprises a core cutoff wavelength, $\lambda_{C2-L2}$, less than 1300 nm.

24. A jumper cable comprising the optical transmission line of claim 16 and an optical fiber connector, wherein at least part of the first optical fiber is disposed within the optical fiber connector.

25. The optical transmission line of claim 16, wherein $L_1$ is less than 10 cm.

26. The optical transmission line of claim 16, wherein $\lambda_{C2-L2}$ is greater than 1500 nm.

27. The optical transmission line of claim 26, further comprising a third optical fiber having a length $L_3$ and a measured cutoff wavelength, $\lambda_{C3-L3}$, corresponding to the length $L_3$, wherein $\lambda_{C3-L3}$ is measured with respect to a multimode reference under FOTP-80, wherein $\lambda_{C3-L3}$ is less than 1260 nm, and wherein a second end of the second optical fiber of claim 1 is optically coupled to the third optical fiber.

28. An optical fiber comprising a first region comprising $\Delta 1_{MAX}$, a second region surrounding the first region and comprising $\Delta 2_{MAX}$ and a width $W_2$, and a third region surrounding the second region and comprising $\Delta 3_{MIN}$, wherein $\Delta 1_{MAX} > \Delta 2_{MAX} > \Delta 3_{MIN}$, wherein said fiber exhibits a 22 meter cut-off wave length which is less than 1300, and a 2 meter cut-off which is more than 100 nm greater than the 22 meter cut-off wave length.

29. The fiber of claim 28, wherein said fiber exhibits a 22 meter cut-off wave length of less than 1260 nm.

* * * * *